United States Patent [19]

Munk et al.

[11] 4,171,396

[45] Oct. 16, 1979

[54] ARTICLE MOLDED FROM FIBROUS MATERIAL

[75] Inventors: Edmund E. Munk; Herbert G. Haas, both of Oberstenfeld, Fed. Rep. of Germany

[73] Assignee: Werzalit-Pressholzwerk J.F. Werz Jr. KG, Stuttgart, Fed. Rep. of Germany

[21] Appl. No.: 861,640

[22] Filed: Dec. 19, 1977

Related U.S. Application Data

[60] Continuation-in-part of Ser. No. 571,619, Apr. 25, 1975, which is a division of Ser. No. 340,934, Mar. 13, 1973, Pat. No. 4,078,030.

[51] Int. Cl.[2] .............................................. B32B 3/30

[52] U.S. Cl. .................................. 428/171; 428/182; 428/326

[58] Field of Search ............... 428/171, 182, 183, 184, 428/185, 186, 326; 264/108, 119, 320, 325; 156/210

[56] References Cited

U.S. PATENT DOCUMENTS

| | | | |
|---|---|---|---|
| 2,288,072 | 6/1942 | Collins | 264/122 |
| 2,704,268 | 3/1955 | Brown | 428/171 |
| 3,048,537 | 8/1962 | Pall et al. | 264/126 |
| 3,120,466 | 2/1964 | Bojanowski | 264/119 |
| 3,180,911 | 4/1965 | Muller | 264/119 |
| 3,264,380 | 8/1966 | Parsons | 264/122 |
| 3,443,817 | 5/1969 | Reiling | 264/119 |
| 3,621,092 | 11/1971 | Hofer | 264/120 |
| 3,661,688 | 5/1972 | Wheeler | 264/119 |
| 4,061,813 | 12/1977 | Geimer et al. | 428/182 |

*Primary Examiner*—Stanley S. Silverman
*Attorney, Agent, or Firm*—Michael J. Striker

[57] ABSTRACT

A shaped decorative article comprising a rigid body of a densified mixture of particulate material and a binder, the body having a plurality of elongated ridges projecting from the outer surface thereof which are separated from each other by valleys, whereas the inner surface of the body forms a plurality of elongated cavities respectively aligned in longitudinal direction with the ridges, each of the ridges has a pair of side faces including an angle with each other and terminating in a tip of rounded cross section constituting the edge of the respective ridge and each of the cavities having an inner end adjacent the tip of the respective ridge. The wall thickness of the body gradually increases from the tip of each ridge to the valleys adjacent thereto to reach its maximum at the center of each valley, and the density of the body gradually decreases from the tip of each ridge toward the adjacent valleys.

10 Claims, 4 Drawing Figures

ARTICLE MOLDED FROM FIBROUS MATERIAL

CROSS-REFERENCE TO RELATED APPLICATIONS

The present application is a continuation-in-part application of the copending application Ser. No. 571,619, filed Apr. 25, 1975, which, in turn, is a division of application Ser. No. 340,934, filed Mar. 13, 1973 now U.S. Pat. No. 4,078,030.

BACKGROUND OF THE INVENTION

The present invention relates generally to articles molded from fibrous material and more particularly to an article molded from a mixture of fibrous matter and a binding material.

There are many instances where decorative moldings for applications to furniture, or coffins, articles for technical use, and the like, are produced by molding these articles from comminuted fibrous material which is admixed with an appropriate binder. If these articles have projecting edges, as is frequently the case, especially in decorative objects provided with depressions and projections to form a pattern, it is very often observed that at the edges of the projections the surface of the object is not smooth but porous. The cause of this is that during the press molding relative displacement of the material takes place in these regions during the movement of the mold members against each other, resulting in a lack of homogenity of the material in these regions. This is caused by the fact that the material available for forming a clearly defined non-porous edge is displaced during such movement and that there is therefore right at the critical line where the edges are to be formed, not sufficient material present for the requisite molding pressure to develop. This means that a closed non-porous surface with a sharp edge is often impossible to obtain in the molding of such objects.

SUMMARY OF THE INVENTION

It is a general object of the present invention to overcome this disadvantage of the prior art.

More particularly, it is an object of the present invention to provide an improved shaped article having at least one or a plurality of elongated ridges projecting from the outer surface thereof and in which the density of the body at the outer edges of the ridges is greater than at other portions of the body so as to assure non-porous surface portions at the outer edges of the ridges.

With these and other objects in view, which will become apparent as the description proceeds, the shaped article according to the invention mainly comprises a rigid body of a densified mixture which includes a particulate material and binder, in which a body has an outer surface provided with at least one elongated ridge having a pair of side faces including an angle with each other and terminating in a tip constituting the edge of the ridge, and an inner surface forming in the region of the ridge an elongated cavity aligned in longitudinal direction with the ridge, in which the cavity has an inner end adjacent to the aforementioned tip which is spaced from the tip a distance smaller than the spacing of any other point of the inner surface from an opposite point of the outer surface, and in which the body has in the region of said tip a greater density than in the remainder of the body.

The elongated cavity is defined by a pair of opposite faces including an angle with each other which is smaller than the angle included between the side faces of the ridge, so that the wall thickness of the ridge gradually increases in a direction away from the tip thereof.

The tip of the ridge has preferably, in a cross-section normal to its elongation, a rounded contour of a predetermined radius of curvature and the inner end of the cavity may have, in a cross-section normal to the elongation of the cavity, likewise a rounded contour, but of a radius of curvature smaller than that of the tip, or the opposite faces of the elongated cavity may be joined at the inner end thereof by a planar face extending normal to the longitudinal plane of symmetry through the ridge.

Preferably, the shaped article includes a plurality of parallel ridges separated by valleys from each other and in this case the density of the body in the region of the tip of each of these ridges exceeds the density of the body in the region of each of the valleys.

The plurality of ridges may have different heights and the various tips of the ridges preferably having, in cross-sections normal to the elongations thereof, rounded contours with the radius of curvature of the tips on some of the ridges differing from those of the tips of other ridges, in which the density of the body in the regions of the tips is the greater the smaller the radius of curvature is.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
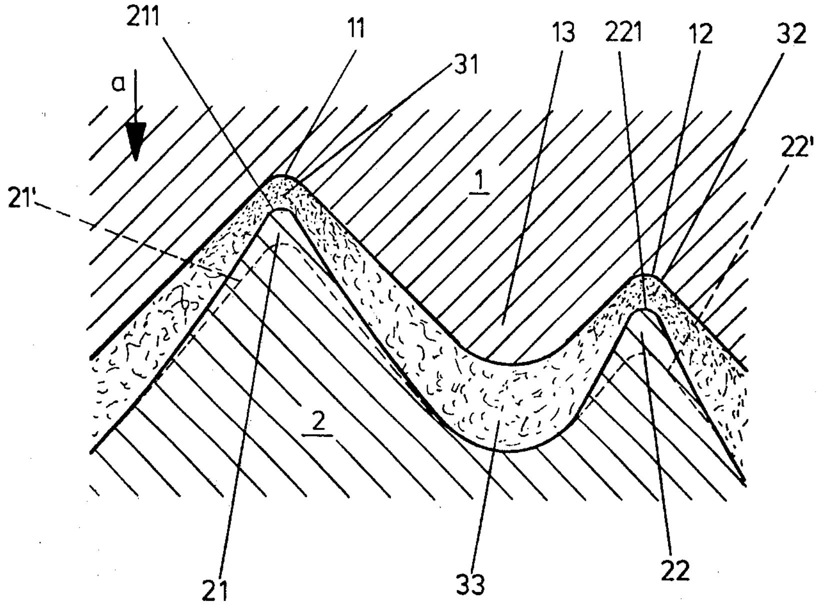
FIG. 1 is a fragmentary sectional view showing a portion of a first mold for molding the article according to the present invention.

It should be noted that in the drawing all Figures are merely diagrammatic, and that such well-known components as means for effecting relative movement between the mold sections have been omitted for the sake of clarity and because they do not form part of the invention.

With this in mind, it will be seen that in FIG. 1, the arrow a designates the direction of movement of a mold section 1 which moves from above into a mold section 2, the latter accommodating the material to be molded. In this embodiment it is the contour of the surface of the mold section 1 which determines the outer surface of the article to be molded. For purpose of explanation it is assumed that it is here desired to form an article with ridges 31 and 32, separated by a valley 33, but of course the article to be molded may have a greater or smaller plurality of ridges separated by valleys.

The surface of the mold section 1 facing the mold section 2 is provided with a relatively far outwardly extending projection 13 forming the valley 33 and recesses 11, 12 forming the projections 31 and 32 in the article to be molded.

Turning to the mold section 2, it will be seen that the contour of the surface facing the mold section 1 corresponds only approximately to the contour of the juxtaposed surface of the latter mold section. The mold section 2 is provided with a projection 21 which will enter into the recess 11 and with an other projection 22 which will enter into the recess 12. The usual compacting ratio in the molding of such objects is approximately 1:5 and to obtain this, the mold section 2 would have to have a mold surface juxtaposed with the mold section 1, which is shown by the broken line contour 21′, 22′. However, as the drawing clearly shows, the projections 21 and 22 extend considerably beyond the respective contours 21′ and 22′, so that in the closed mold, as shown in FIG. 1, the surface portions of the mold section 2 at the projections 21 and 22 are brought much closer to the opposite surface portions of the mold section 1 than in the valley 33 separating the two projections. Even if the material, such as comminuted fibrous material admixed with a synthetic plastic binder, tends to the formation bridges and material is displaced to some extent out of the recesses 11 and 12 during closing of the mold, it will be evident that the material of the article to be molded will be compressed to a higher degree in the region of the ridges 31 and 32 than in the valleys 33 separating the two ridges, to thus produce a surface of the article to be molded which is smooth and free from pores.

It should be noted that the edge 221 of the projections 22, as well as the edge 211 of the projection 21, is slightly rounded, in order to avoid the least possible amount of displacement of the material during closing of the mold and also in order to prevent a possible damage of the fibers of the material.

Figure 2:
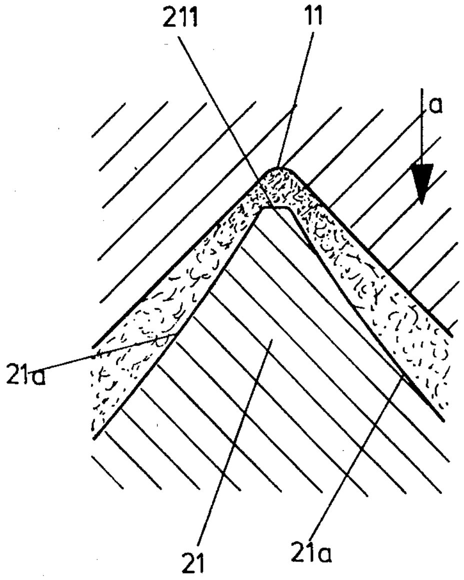
FIG. 2 is a view similar to FIG. 1 showing a somewhat different mold.

The embodiment of FIG. 2 is essentially the same as that of FIG. 1, except that the configuration of the edge 211 of the projection or ridge 21 is somewhat different from the embodiment of FIG. 1. In FIG. 2, wherein like reference numerals designate like components, the projection 21 has a substantially flat end face extending normal to the direction of mold closing, indicated by the arrow a in FIG. 1, which end face 211 merges into the side faces 21a bounding the projection 21 with slightly rounded surface portion. This embodiment provides an even better protection against lateral displacement of fiber bridges, when the projection 21 enters into the corresponding recess of the mold section 1.

Figure 3:
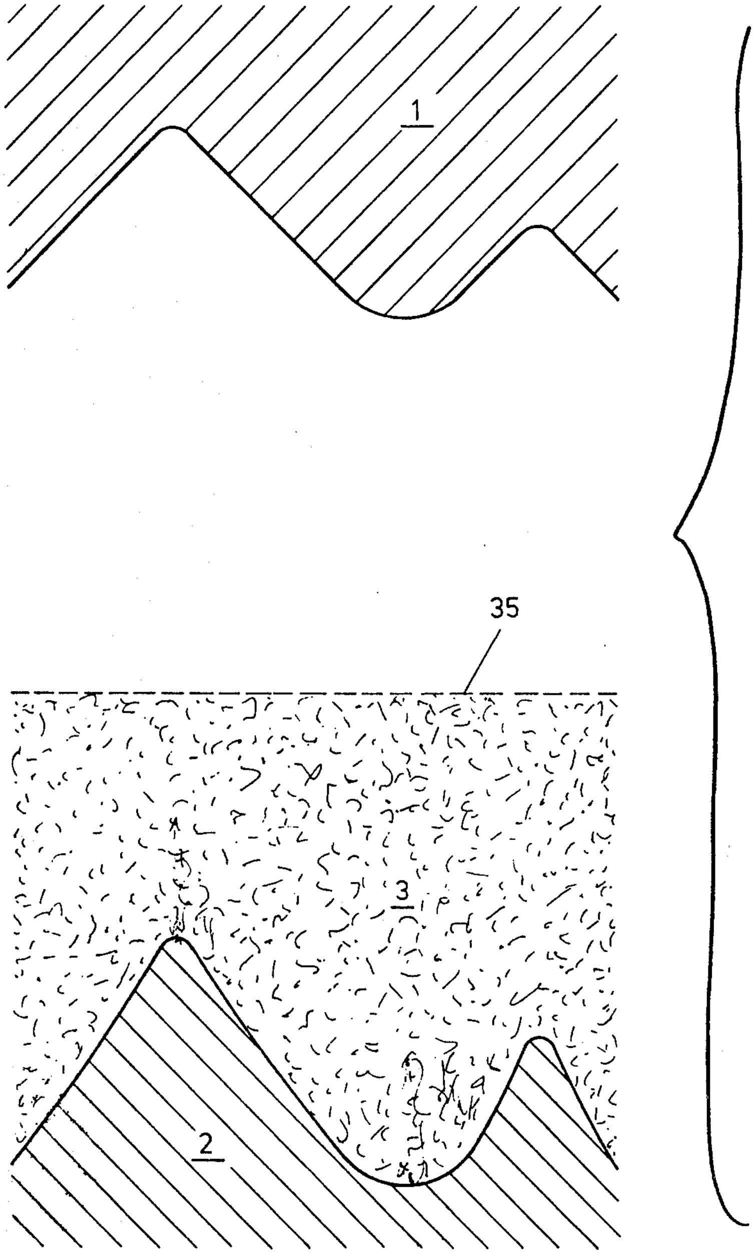
FIG. 3 shows the mold of FIG. 1 in opened condition.

FIG. 3 illustrates the mold sections of FIG. 1 in open position. The material to be molded into the article of the present invention is designated with the reference numeral 3 and it is placed into the mold section 2 so as to have an upper planar surface 35.

Figure 4:
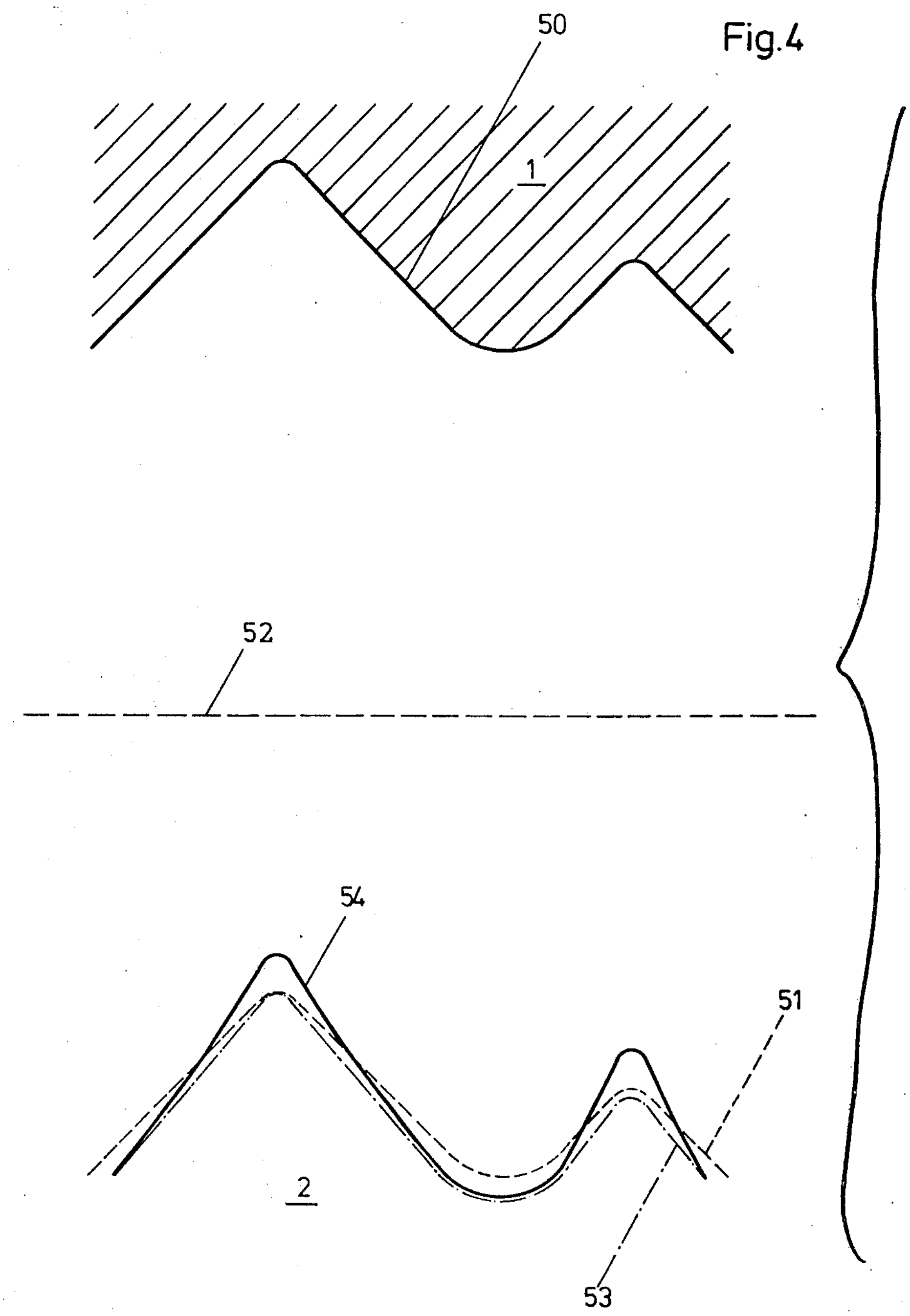
FIG. 4 is an exploded view showing dimensional relationships of the mold sections.

To produce the molds of the apparatus for forming the article according to the present invention, we have found it advantageous if the mold section 1 is provided on its exposed surface 50 with a profile corresponding to the desired outer surface of the article to be molded. This is done, taking into consideration the desired minimum wall thickness at normal compression and with the assumption that the material to be molded will be poured into the mold section 2 so as to form an even surface above the same as indicated by the dotted line 52, shown in FIG. 4. A similar outline is then made for the profiling of the exposed surface of the mold section 2, as indicated by the broken line 51. Now taking into consideration that the material to be molded is poured onto the mold section 2 so that it forms an upper even horizontal surface 52, meaning that the height of the material is different over different portions of the mold section 2, the originally traced profile of the surface of the mold section 2 is slightly changed in those areas where the height of the material to the surface 52 will be greatest, so that despite the greater thickness or height of the material in these areas, a compression ratio of a desired magnitude, for instance 1:5, will be achieved during the compression. This will result in a profile 53 illustrated in dash-dot lines in FIG. 4. At those portions of the mold section 2 which in combination with the surface 50 of the mold section 1 will produce projecting ridges on the article to be molded, and where according to the invention a greater compression of the molding material is desired, the surface of the mold section 2 is then further modified so as to project outwardly beyond the initial contour 51 to the extent as indicated by the full line 54. This will result, as shown in FIG. 1, that when the mold sections are brought to the closed position, the projections 21 and 22 on the mold section 2 will be located closer to the opposite portions of the mold section 1 than in the valley 33 intermediate the ridges 21 and 22, to thereby compress the material from which the article is molded to a considerably greater extent at the ridges 31 and 32 of the article than in the valleys 33 located therebetween, which will assure that the outer surface of the article to be molded will be smooth and nonporous even at the ridges 31 and 32 of the article.

Normally, the relatively flat female mold section, that is the mold section 2, is filled with the material to be compressed so that the material has an upper planar surface. The press surface of the mold section 2 must therefore be constructed in such a manner that, at the deepest portions thereof, that is at the portions of the greatest height of the material placed thereinto, at the end of the compression stroke a greater material height is provided than at the portions of the projections of the mold section 2 which correspond to the ridges of the molded article. Starting from the desired profile, the outer surface of the mold section 2 must therefore be determined in the manner as discussed above in connection with FIG. 4. According to the invention the profile of the mold section 2 is thus laid out in such a manner that the height of the projections on the mold section 2, which will produce the ridges of the molded article, is increased so that at this portion of the molded article a greater compression of the material is obtained than would correspond to the normal compression ratio. The normal compression ratio is about 1:5 or 1:7, whereas at the ridges of the molded article a compression ratio of 1:9 is obtained, which gradually decreases toward the valley of the molded article.

The present invention can be carried out in various different ways, that is, the material to be molded may, after filling of the mold, be directly subjected to a hot molding process in which the article to be molded may be finished in a single operation. On the other hand, it is also possible to form initially a prepressed blank produced in a cold pressing operation which is subsequently subjected to a second pressing operation under the influence of heat, in which the article is molded to a final form and in which hardening of the binder material takes place during the second operation. If the article according to the present invention is molded in a two stage operation, in which first cold pressing and then hot pressing is utilized, a densification in the region of the ridges of the article being formed may not be necessary during the cold pressing stage, although this can be done. It is also possible that during the cold pressing operation the ridges of the molded article are produced with a sharp edge which is subsequently formed into rounded edge in the hot pressing operation, with a corresponding further compression of the ridges. In both cases, that is in the single step operation or in the two step operation, a rigid article is produced in which the material at the ridges of the article is compressed to a higher degree than the material in the valleys located between the ridges and the wall thickness of the molded article in the region of the ridges is smaller than in the region of the valleys therebetween.

It will be seen that the present invention overcomes the disadvantages of the prior art and provides a highly desirable advantage that will be most readily recognized by those conversant with the field and those who have attempted to clean, varnish and particularly stain molded objects of the type in question produced according to the prior art, only to find that at the ridges the object will take stain or paint in a completely different manner than over the rest of the surface, due to the high porosity in the region of the ridges, with the result that the object provides a very uneven, frequently aesthetically displeasing appearance.

It will be understood that each of the elements described above, or two or more together, may also find a useful application in other types of molded articles different from the types described above.

While the invention has been illustrated and described as embodied in articles molded from fibrous material combined with an appropriate binder and provided with projecting ridges separated by valleys, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristcis of the generic or specific aspects of this invention.

What is claimed as new and desired to be protected by Letters Patent is set forth in the appended claims:

1. A shaped article comprising a rigid body of a densified mixture which includes particulate material and a binder, said body having an outer surface provided with at least one elongated ridge having a pair of side faces including an angle with each other and terminating in a tip constituting an edge of said ridge and an inner surface forming in the region of said ridge an elongated cavity aligned in longitudinal direction with said ridge, said cavity having an inner end adjacent said tip and which is spaced from said tip a distance smaller than the spacing of any other point of said inner surface from an opposite point of the outer surface, and said body having in the region of said tip a greater density than in the remainder of said body, to assure that said body has a non porous surface even at the edge of said ridge.

2. A shaped article as defined in claim 1, wherein said particulate material is constituted by comminuted cellulose fibers and wherein said binder is a thermosetting binder.

3. A shaped article as defined in claim 1, wherein said elongated cavity is defined by a pair of opposite faces including an angle with each other which is smaller than the included angle between said side faces so that the wall thickness of said ridge gradually increases in a direction away from said tip.

4. A shaped article as defined in claim 3, wherein said tip of said ridge has in a cross-section normal to its elongation a rounded contour of a predetermined radius of curvature and wherein said inner end of said cavity has in a cross-section normal to the elongation of said cavity a rounded contour of a radius of curvature smaller than that of said tip.

5. A shaped article as defined in claim 3, wherein said tip of said ridge has in a cross-section normal to its elongation a rounded contour of a predetermined radius of curvature and wherein said opposite faces of said elongated cavity are joined at the inner ends thereof by a planar face extending normal to a longitudinal plane of symmetry through said ridge.

6. A shaped article as defined in claim 1, wherein said shaped article includes a pair of valleys to opposite sides of said ridge and wherein said inner surface is spaced from said outer surface at a maximum distance in the region of said valleys and wherein said body has a greater density in the region of said tip than in the region of said valleys.

7. A shaped article as defined in claim 6, wherein said shaped article includes a plurality of parallel ridges separated by valleys from each other, and wherein the density of the body in the region of said tip of each of said ridges exceeds the density of said body in the region of each of said valleys.

8. A shaped article as defined in claim 7, wherein said plurality of ridges have different heights.

9. A shaped article as defined in claim 7, wherein the tip of each ridge has in a cross-section normal to its elongation a rounded contour having a radius of curvature, wherein the radius of curvature of the tip on some of said ridges differs from those of the tips of the other ridges, and wherein the density of said body in the region of said tips is the greater the smaller the radius of curvature is.

10. A shaped article as defined in claim 7, wherein said shaped article is a decorative body.

* * * * *